Patented Aug. 2, 1949

2,477,717

UNITED STATES PATENT OFFICE 2,477,717

VINYL RESINS PLASTICIZED WITH POLYALKYLNAPHTHALENES

Preston L. Brandt, Galveston, Tex., assignor to Pan American Refining Corporation, Texas City, Tex., a corporation of Delaware No Drawing. Application October 1, 1946, Serial No. 700,365

22 Claims. (Cl. 260—31.8)

This invention relates to plasticized vinyl resin compositions comprising, as a plasticizing agent, a polyalkylnaphthalene containing at least three alkyl groups which contain a total of 8 to 10 carbon atoms.

Widespread use has been made of esters of polybasic carboxylic acids, especially dialkyl phthalates containing between 4 and 8 carbon atoms, inclusive, in the alkyl groups, and of organic phosphates, for plasticizing vinyl resins. Although various satisfactory ester plasticizers have been developed they have suffered to some extent from certain technical disabilities and principally from their high cost.

It is an object of this invention to provide novel plasticized vinyl resins. Another object of our invention is to produce novel plasticized conjoint polymers of a vinyl ester of a lower aliphatic carboxylic acid and a vinyl halide, for example, vinyl chloride-acetate copolymers. Another object of this invention is to provide synthetic polyalkylnaphthalene plasticizers for vinyl resins. Another object is to provide a method of plasticizing vinyl esters wherein the plasticizing effects of plasticizing esters of polybasic acids are extended to a substantial degree by the inclusion therewith of polyalkylnaphthalenes containing at least three alkyl groups and a total of 8 to 10 carbon atoms in the alkyl groups. These and other objects will become apparent from the ensuing description of the invention.

This invention is particularly concerned with the plasticizing of vinyl resins prepared by the conjoint polymerization of vinyl halides, such as vinyl chloride, with vinyl esters of the lower aliphatic carboxylic acids such as vinyl formate, vinyl acetate, vinyl propionate and vinyl butyrate. Preferred resins of this type may be prepared from vinyl chloride and vinyl acetate in proportions ranging between about 60 and 95 parts of vinyl chloride to about 40 to about 5 parts of the acetate; those resins are particularly desirable which contain in the polymer from about 80 to about 95 parts of vinyl chloride and have an average molecular weight between about 10,000 and about 25,000, as estimated from the specific viscosity of dilute solutions according to Staudinger's method.

I have discovered the unexpected fact that polyalkylnaphthalenes containing at least three alkyl groups which contain a total of 8 to 10 carbon atoms, inclusive, can be used to plasticize vinyl resins such as result from the conjoint polymerization of vinyl chloride with vinyl acetate, for example the commercial vinyl chloride-acetate copolymers containing between about 80 and about 95 percent of vinyl chloride. These polyalkylnaphthalenes can be employed as co-plasticizing agents with various plasticizing esters, especially dialkyl phthalates containing between 4 and 8 carbon atoms, inclusive, in the alkyl groups. The novel joint plasticizers of this invention afford a wide range of plasticized vinyl polymers whose tensile strength, hardness, elasticity, etc. can be varied within broad limits.

Coal tar oils, mono- and di-amylnaphthalenes, cyclohexyl naphthalene and the like have previously been proposed for use as plasticizers with certain vinyl resins. I have observed that superior and duplicatable plasticizing effects can be obtained with polyalkylnaphthalenes containing at least three alkyl groups which contain between 8 and 10 carbon atoms. It appears that the action of polyalkylnaphthalenes as plasticizers and as co-plasticizers (with ester-type plasticizers) in certain vinyl resins, for example commercial vinyl chloride-acetate copolymers, is related not only to the total number of alkyl carbon atoms in the polyalkylnaphthalene but also to the total number of alkyl groups and that the presence of at least 3 alkyl groups on the naphthalene nucleus is essential.

The polyalkylnaphthalenes employed in accordance with this invention are not, to the best of my knowledge, found in appreciable proportions in oils derived from coal, coal tar, petroleum or the like. Suitable polyalkylnaphthalenes for employment in accordance with this invention can be produced by the catalytic alkylation of certain hydrocarbon fractions containing substantial proportions of mono-, di- or tri-methylnaphthalenes, with olefins such as ethylene, propylene, butylenes, pentenes or hexenes, etc. for example as described in application for Letters Patent, Serial No. 609,882, filed by Francis T. Wadsworth and Robert J. Lee, August 9, 1945 now Patent Number 2,462,792. In that application there is described the alkylation of fractions containing mono-, di- and trimethylnaphthalenes, produced by the hydroforming of petroleum naphthas or by the cracking of petroleum oils, olefins being employed as the alkylating agents and anhydrous toluenesulfonic acid as the catalyst at temperatures between about 265 and 300° F. under pressure sufficient to maintain a liquid phase in the alkylation zone. It should be understood that this invention is not restricted to the employment of polyalkylnaphthalenes, as described herein, derived from any particular source or synthesized by any particular method.

However, the employment of synthetic polyalkylnaphthalenes is advantageous because of their uniform composition and desirable plasticizing effects.

Reference is made to the following tables for examples which are illustrative of this invention. Table 1 presents examples of unfilled plasticized vinyl resins and Table 2 describes filled resins.

The resin which was plasticized in the tabulated examples was Vinylite VYNW a commercial product containing between 93 and 95 percent by weight of vinyl chloride and 7 to 5 percent of vinyl acetate, prepared by conjoint polymerization of vinyl chloride and vinyl acetate. The dioctyl phthalate which was used was a commercial product supplied by Carbide and Carbon Chemicals Corp. Following are inspections on dibutyldimethyl naphthalenes and dipropyldimethyl naphthalenes typical of compounds employed in the examples.

resins which were softer, more extensible and more resistant to tearing.

In compounds 5 and 6, 20 and 30 parts, respectively, of the dioctyl phthalate of compound 4 were replaced by dibutyldimethylnaphthalenes, resulting in softer and more flexible compositions than compound 4, as clearly shown by the test data. When 30 parts of the dioctyl phthalate of compound 4 are replaced with 40 parts of dibutyldimethylnaphthalenes as in compound 7, the composition very closely resembles compound 5 which contains 40 parts of dioctyl phthalate and 20 parts of dibutyldimethylnaphthalenes. Both compounds 5 and 7 are soft and pliable.

In compounds 8 and 9, 20 and 30 parts, respectively, of the dioctyl phthalate of compound 2 were replaced with dipropyldimethylnaphthalenes. Compounds 8 and 9 are softer than compound 4. When 30 parts of the dioctyl phthalate of compound 4 were replaced by 40 parts of di- Table 1

| Compound No. | 1 | 2 | 3 | 4 | 5 | 6 | 7 | 8 | 9 | 10 |
|---|---|---|---|---|---|---|---|---|---|---|
| Components, parts by wt.: | | | | | | | | | | |
| Vinylite VYNW Resin | 100 | 100 | 100 | 100 | 100 | 100 | 100 | 100 | 100 | 100 |
| Di-2-ethylhexyl Phthalate | | | 40 | 60 | 40 | 30 | 30 | 40 | 30 | 30 |
| Dibutylmethylnaphthalenes [1] | 50 | 50 | | | 20 | 30 | 40 | | | |
| Dipropylmethylnaphthalenes [2] | | | | | | | | 20 | 30 | 40 |
| PbO | | | 1 | 1 | 1 | 1 | 1 | 1 | 1 | 1 |
| Stearic Acid | 1 | 1 | 1 | 1 | 1 | 1 | 1 | 1 | 1 | 1 |
| Stabilizer [3] | 3 | 3 | | | | | | | | |
| Total parts by weight | 154 | 154 | 142 | 162 | 162 | 162 | 172 | 162 | 162 | 172 |
| Test Data: | | | | | | | | | | |
| Modulus, 200%, p. s. i | 1,750 | 1,570 | | 1,955 | 1,465 | 1,585 | 1,445 | 1,665 | 2,325 | 1,155 |
| Tensile Strength, p. s. i | 2,360 | 2,410 | 3,200 | 2,795 | 2,295 | 2,450 | 2,165 | 2,355 | 2,650 | 2,250 |
| Elongation, Per Cent | 280 | 320 | 135 | 315 | 355 | 345 | 335 | 335 | 310 | 415 |
| Hardness | 76 | 73 | 84 | 81 | 72 | 75 | 70 | 72 | 77 | 65 |
| Lbs. Tear | 365 | 390 | | 297 | 260 | 256 | 213 | 201 | 318 | 176 |

[1] Actually a mixture of dibutyl mono-, di- and tri-methylnaphthalenes.
[2] Actually a mixture of dipropyl mono-, di- and trimethylnaphthalenes.
[3] Made by Advance Solvents and Chemicals Corp.

| | "Dipropyldimethylnaphthalenes" | "Dibutyldimethylnaphthalenes" |
|---|---|---|
| Sp. Gr. (60/60° F.) | 0.9590 | 0.960. |
| Boiling Range, °C | 225-250 at 50 mm. 300-330 at 769 mm | 153-260 at 10 mm. 321-394 at 1 atm. |
| Ref. Index ($n_D^{25}$) | 1.5730 | 1.5648. |
| Aromatics, percent | 100 | 99-100. |
| Viscosity, Centistokes at 100° F. | 30.6 | 92.0. |
| Color (ASTM) | 1½ | 1½-2½. |

Compounds 1 and 2 illustrate the plasticizing effects of dibutylmethylnaphthalenes alone on the vinyl resin. Compounds 3 and 4 illustrate the plasticizing effects of dioctyl phthalate alone on the vinyl resin. It will be noted that the incorporation of dibutylmethylnaphthalenes in the vinyl resin in amounts comparable with the dioctyl phthalate of compounds 3 and 4 yielded propyldimethylnaphthalenes, the softest formulation of this series was observed (compound 10).

Compounds 11 to 19 (Table 2) contain various proportions of Thermax, whiting and clay as fillers. Thermax is a carbon black produced by thermal decomposition of natural gas in a refractory brick checkerwork and is a product of the Thermatomic Carbon Co. The Thermax and clay compounds give high hardness and low elongation. The whiting compounds are softer and give good elongation and low tensile strength.

Table 2

| Compound No. | 11 | 12 | 13 | 14 | 15 | 16 | 17 | 18 | 19 |
|---|---|---|---|---|---|---|---|---|---|
| Components, parts by wt.: | | | | | | | | | |
| Vinylite VYNW Resin | 100 | 100 | 100 | 100 | 100 | 100 | 100 | 100 | 100 |
| Dioctyl phthalate | 40 | 40 | 40 | 40 | 40 | 40 | 40 | 40 | 40 |
| Dipropyldimethylnaphthalenes | 60 | 60 | 60 | 60 | 60 | 60 | 60 | 60 | 60 |
| Thermax | 100 | | | 200 | | | | 150 | |
| Whiting | | 100 | | | 200 | | 200 | | 300 |
| Clay | | | 100 | | | 200 | | | |
| Litharge | 3 | 3 | 3 | 3 | 3 | 3 | 3 | 3 | 3 |
| Stearic Acid | 2 | 2 | 2 | 2 | 2 | 2 | 2 | 2 | 2 |
| Total parts by weight | 305 | 305 | 305 | 405 | 405 | 405 | 405 | 355 | 520 |
| Test Data: | | | | | | | | | |
| Modulus, 200%, p. s. i | 1,440 | 700 | 1,275 | | | | | | |
| Tensile strength, p. s. i | 1,530 | 1,160 | 1,540 | 1,000 | 915 | 1,840 | 835 | 1,525 | 670 |
| Elongation, per cent | 235 | 350 | 260 | 80 | 255 | 60 | 290 | 100 | 265 |
| Hardness | 72 | 65 | 70 | 89 | 73 | 87 | 74 | 85 | 80 |
| Lbs. tear | 258 | 114 | 204 | 143 | 141 | 136 | 110 | 250 | 85 |

In compound 19, 300 parts of whiting were added to 100 parts of vinyl resin. This formulation has the desirable hardness and elongation of a typical polyvinyl chloride-acetate copolymer although the tensile strength is low. It is a bright red plastic material which is permanent in sunlight. Compound 19 represents an extremely economical combination of ingredients.

A fact not readily grasped merely from an inspection of the data presented in the above tables is that the compounds therein are "dry", i. e. no exudation of the plasticizing components to the surface of the sample occurs, even on prolonged exposure of the samples to atmospheric conditions.

The polyalkylnaphthalenes of this invention have a pleasant odor which is imparted to the vinyl resins plasticized thereby. On the other hand, many of the conventional plasticizers for vinyl resins, such as dioctyl phthalates, impart an unpleasant odor to the resins which they plasticize.

It will be understood that the tabulated formulations merely present illustrations of applications of the present inventive concept and that widely different formulations can be made without departing from the spirit of the invention. Thus, I may employ different vinyl resins, for example various polyvinyl chlorides, polyvinyl acetals, vinyl copolymers with various polymerizable materials, etc. The dioctyl phthalate plasticizer of the above examples may be replaced by other plasticizing esters of acids which have been found capable of plasticizing various vinyl resins, for example dibutyl phthalate, diamyl phthalate, dicapryl phthalate, di (chloroethoxyethyl) phthalate, di (methoxyethyl) phthalate, di (butoxyethyl) phthalate, triethylene glycol di-2-ethyl-hexoate, di (2-ethylhexyl) sebacate, butyl acetyl ricinoleate, triethylene glycol dipelargonate, methoxyethyl acetyl ricinoleate, butoxyethyl acetyl ricinoleate, dibutyl sebacate, di (chloroethyl) succinate, di (chloroethoxyethyl) maleate, tricresyl phosphate, triphenyl phosphate, trioctyl phosphate, and the like. I may also employ a plurality of plasticizing esters with polyalkylnaphthalenes containing at least three alkyl groups which contain between 8 and 10 carbon atoms. I may also employ mixtures of polyalkylnaphthalenes and one or more plasticizing esters.

Different fillers may be employed than those chosen in the above examples, for example wood flour, mica, talc, alpha-cellulose, etc.

Although the examples in the above tables point out suitable proportions of the various ingredients to make commercially attractive plasticized vinyl resins, it should be understood that these and equivalent ingredients may be used in different proportions. In general, I may employ between 20 and about 200 weight percent of combinations of polyalkylnaphthalene and ester-type plasticizers, based on the vinyl resins (exclusive of fillers). When the polyalkylnaphthalene plasticizers of this invention are employed alone in vinyl resins, permanently compatible blends may contain up to about 50 per cent by weight of polyalkylnaphthalene, based on the weight of vinyl resin.

Having thus described my invention, what I claim is:

1. A plasticized composition comprising a vinyl resin and a polyalkylnaphthalene containing at least three alkyl groups and containing a total of 8 to 10 carbon atoms in the alkyl groups.

2. A plasticized composition comprising a vinyl resin and a tetraalkylnaphthalene containing a total of 8 to 10 carbon atoms in the alkyl groups.

3. A plasticized composition comprising a vinyl resin and a dibutyldimethylnaphthalene.

4. A plasticized composition comprising a vinyl resin and a dipropyldimethylnaphthalene.

5. A plasticized composition comprising a conjoint polymer of a vinyl halide with a vinyl ester of a lower aliphatic carboxylic acid, and a polyalkylnaphthalene containing at least three alkyl groups and containing a total of 8 to 10 carbon atoms in the alkyl groups.

6. A plasticized composition comprising a conjoint polymer of vinyl chloride with vinyl acetate, and a polyalkylnaphthalene containing at least three alkyl groups and containing a total of 8 to 10 carbon atoms in the alkyl groups.

7. A plasticized composition comprising a vinyl chloride-acetate copolymer containing between 80 and 95 percent of polymerized vinyl chloride, and a polyalkylnaphthalene containing at least three alkyl groups and containing a total of 8 to 10 carbon atoms in the alkyl groups.

8. A plasticized composition comprising a vinyl chloride-acetate copolymer containing between 80 and 95 percent of polymerized vinyl chloride and between about 25 percent and about 50 percent by weight, based on the weight of the vinyl resin, of a polyalkylnaphthalene containing at least three alkyl groups and containing a total of 8 to 10 carbon atoms in the alkyl groups.

9. A plasticized composition comprising a vinyl chloride-acetate copolymer containing between 80 and 95 percent of vinyl chloride, and a dipropyldimethylnaphthalene.

10. A plasticized composition comprising a vinyl chloride-acetate copolymer containing between 80 and 95 percent of vinyl chloride, and a dibutyldimethylnaphthalene.

11. The method which comprises plasticizing a vinyl resin by adding thereto a polyalkylnaphthalene containing at least three alkyl groups and containing a total of 8 to 10 carbon atoms in the alkyl groups.

12. The method which comprises plasticizing a conjoint polymer of a vinyl halide with a vinyl ester of a lower aliphatic carboxylic acid by adding thereto a polyalkylnaphthalene containing at least three alkyl groups and containing a total of 8 to 10 carbon atoms in the alkyl groups.

13. The method which comprises plasticizing a conjoint polymer of vinyl chloride with vinyl acetate by adding thereto a polyalkylnaphthalene containing at least three alkyl groups and containing a total of 8 to 10 carbon atoms in the alkyl groups.

14. The method which comprises plasticizing a vinyl resin resulting from conjoint polymerization of vinyl chloride with vinyl acetate with a dipropyldimethylnaphthalene.

15. The method which comprises plasticizing a vinyl resin resulting from conjoint polymerization of vinyl chloride with vinyl acetate with dibutyldimethylnaphthalene.

16. A plasticized composition comprising a vinyl resin and a polyalkylnaphthalene containing at least three alkyl groups and containing a total of 8 to 10 carbon atoms, inclusive, in the alkyl groups, said polyalkylnaphthalene being present in said composition in an amount sufficient to increase the plasticity of said resin but not in excess of about 50% by weight based on the weight of said vinyl resin.

17. A plasticized composition comprising a vinyl resin and a mixture of polyalkylnaphthalenes containing at least three alkyl groups and containing a total of 8 to 10 carbon atoms, inclusive, in the alkyl groups, said mixture of polyalkylnaphthalenes being present in said composition in an amount sufficient to increase the plasticity of said resin but not in excess of about 50% by weight based on the weight of said vinyl resin.

18. A plasticized composition comprising a conjoint polymer of a vinyl halide with a vinyl ester of a lower aliphatic carboxylic acid, and a polyalkylnaphthalene containing at least three alkyl groups and containing a total of 8 to 10 carbon atoms, inclusive, in the alkyl groups, said polyalkylnaphthalene being present in said composition in an amount sufficient to increase the plasticity of said conjoint polymer but not in excess of about 50% by weight based on the weight of said conjoint polymer.

19. A plasticized composition comprising a conjoint polymer of a vinyl halide with a vinyl ester of a lower aliphatic carboxylic acid, and a mixture of polyalkylnaphthalenes containing at least three alkyl groups and containing a total of 8 to 10 carbon atoms, inclusive, in the alkyl groups, said mixture of polyalkylnaphthalenes being present in said composition in an amount sufficient to increase the plasticity of said conjoint polymer but not in excess of about 50% by weight based on the weight of said conjoint polymer.

20. A plasticized composition comprising a conjoint polymer of vinyl chloride with vinyl acetate, and a mixture of polyalkylnaphthalenes containing at least three alkyl groups and containing a total of 8 to 10 carbon atoms, inclusive, in the alkyl groups, said mixture of polyalkylnaphthalenes being present in said composition in an amount sufficient to increase the plasticity of said conjoint polymer but not in excess of about 50% by weight based on the weight of said conjoint polymer.

21. A plasticized composition comprising a vinyl resin, a polyalkylnaphthalene containing at least three alkyl groups and containing a total of 8 to 10 carbon atoms in the alkyl groups, and a dialkyl phthalate containing between 4 and 8 carbon atoms, inclusive, in the alkyl groups.

22. A plasticized composition comprising a vinyl resin, a polyalkylnaphthalene containing at least three alkyl groups and containing a total of 8 to 10 carbon atoms in the alkyl groups, and a dialkyl phthalate containing between 4 and 8 carbon atoms, inclusive, in the alkyl groups, the amount of said polyalkylnaphthalene and of said phthalate jointly being between about 20 and about 200 weight percent, based on said vinyl resin, and the amount of said polyalkylnaphthalene being not more than about 50 weight percent, based on said vinyl resin.

PRESTON L. BRANDT.

REFERENCES CITED

The following references are of record in the file of this patent:

UNITED STATES PATENTS

| Number | Name | Date |
|---|---|---|
| 2,115,896 | Wiezevich | May 3, 1938 |
| 2,303,069 | Sparks | Nov. 24, 1942 |
| 2,307,091 | Yngve | Jan. 5, 1943 |